Dec. 3, 1957    F. W. HARRIS    2,815,198
CERAMIC TILE
Filed March 24, 1952

INVENTOR.
FORD W. HARRIS
BY HIS ATTORNEYS.
HARRIS, KIECH, FOSTER & HARRIS
BY Ford W Harris

United States Patent Office 2,815,198
Patented Dec. 3, 1957

2,815,198

CERAMIC TILE

Ford W. Harris, Los Angeles, Calif., assignor to Wulff Process Company, Huntington Park, Calif., a corporation of California Application March 24, 1952, Serial No. 278,232

2 Claims. (Cl. 263—51)

My invention relates to a new and useful form of ceramic tile formed of heat refractory material, preferably having high heat conductive properties. It also relates to a new and useful form of regenerative mass, preferably formed of such tiles, such a mass being designed for use in, and used in, a regenerative furnace in which high temperatures are employed.

Regenerative masses are commonly used in the arts as heat transfer devices for heating gases to temperatures substantially above 1500° F. Such masses usually consist of fire brick, which will resist high temperatures, laid up in checker-work form so that tortuous channels are provided therethrough. Gases of combustion somewhat below combustion temperatures are passed through the channels during a "heat" period, heating the bricks up to a high temperature and the air, or gas, which it is desired to heat is then passed through said channels. A typical example of such use is an open hearth furnace in which the checker-work is heated by off-gas from the furnace, the checker-work being used to heat the incoming air needed in the operation of the furnace.

It has been found, however, that such regenerative masses are useful in promoting certain chemical reactions such as the formation of acetylene or ethylene from a suitable hydrocarbon such as methane, but the ordinary type of heat regenerator made of fire bricks is quite unsuitable because temperatures as high as 3000° F. may be needed and ordinary fire brick will not withstand these temperatures. An ordinary checker-work is also unsuitable for this work because the channels must be of small minimum area and they must be straight, free, and unobstructed. Due to the high temperatures used in such furnaces, a tile formed of alumina or silicon carbide is preferably used and this tile must be so made that, when the tiles are assembled in a regenerative mass, straight, narrow, continuous, and uninterrupted channels are formed through the mass.

One form of such tile and method of assembling it are shown in Patent No. 2,473,427 patented June 14, 1949 to the assignee of R. L. Hasche. The bricks there shown each consist of a slab having all right-angled corners and having length (L), height (H) and thickness (T), as disclosed and designated in the patent. In furnaces used to produce acetylene by the pyrolysis of hydrocarbons, a furnace erected in accordance with this patent would have vertical channels extending therethrough which, in accordance with the teachings of Patent No. 2,319,679 patented May 18, 1943 to the assignee of R. L. Hasche and W. B. Hincke, would be about one-quarter inch (¼") wide.

It has proved to be extremely difficult to maintain these channels at their initial width and to prevent them from becoming obstructed due to settlement of the regenerative mass or shifting of the bricks in the mass due to heating and cooling. It is an object of my invention to provide a new and useful form of tile which may be assembled to form a new and useful form of regenerative mass in which the tiles are so locked together as to preserve the initial form of the mass and the channels over long periods of severe use.

The support of a regenerative mass having vertical channels therein also presents serious problems. A furnace having a regenerative mass with such vertical channels is shown in Patent No. 2,432,885 patented December 16, 1947 to the assignee of R. L. Hasche. In this patent the lower end of the regenerative mass is supported wholly on a steel structure 25a. When it is understood that portions of applicant's regenerative mass are at temperatures close to 3000° F., it is obvious that some buckling or warping of any steel structure may be expected, especially when the furnace is shut down with a hot mass therein, and the high top temperatures are conducted down to the steel structure.

It is an object of my invention to provide a regenerative mass, the bottom of which is supported wholly on heat insulating material and which is highly refractory at high temperatures, and to provide channels which extend horizontally through the mass. To accomplish this I provide flat tiles which are laid, and supported, on their sides and not on their ends, as shown in the Hasche Patent No. 2,432,885, supra.

In the drawing, which illustrates a preferred form of my invention, I show:

Figure 1:
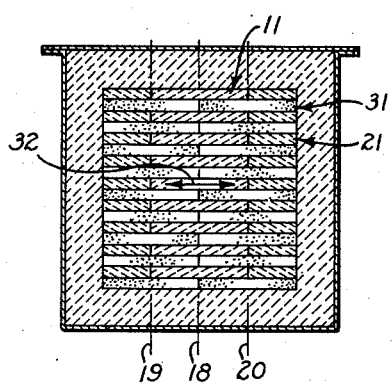
Fig. 1 is a vertical section through a furnace having a new and useful regenerative mass built up of ceramic tile in accordance with my invention.

In Fig. 1 no attempt is made to show the end outlines of the tiles which would be very difficult and confusing owing to the small scale of this figure.

Figure 4:
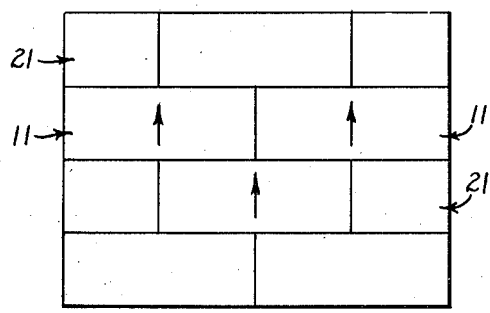
Fig. 4 is a plan view showing how the tiles are laid in the top layer and each alternate lower layer of the furnace.
Figure 2:
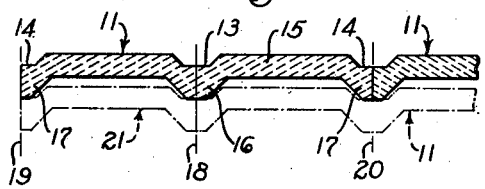
Fig. 2 is a vertical section on a much larger scale than Fig. 1 and showing a section through a portion of the regenerative mass shown in Fig. 1.
Figure 5:
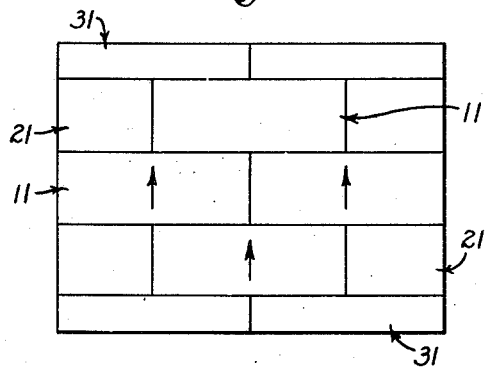
Fig. 5 is a plan view showing how the tiles are laid in each layer next below the layer shown in Fig. 4.
Figure 3:
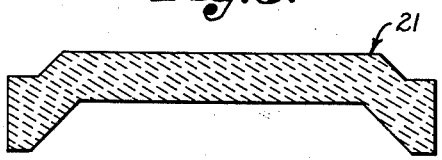
Fig. 3 is a section through a single tile, as shown by dotted lines in Fig. 2.

In Figs. 4 and 5 no attempt is made to show the grooves in the top of the tiles, the outline of each tile being shown in full lines. In Figs. 4 and 5 the grooves and projections on the tiles extend in the direction of the arrows.

Figure 6:
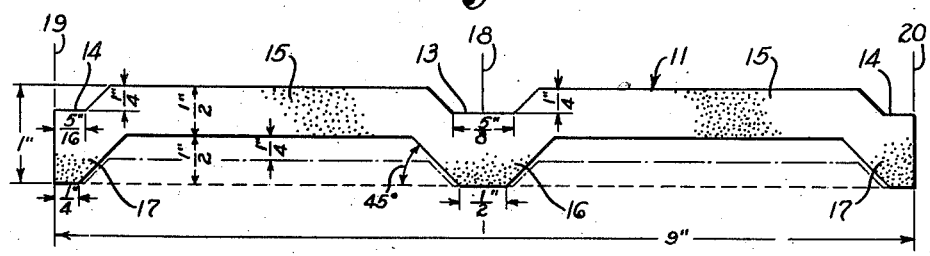
Fig. 6 shows an example of a double tile, dimensions of which are given in the specification to illustrate one way in which a tile embodying my invention may be made.

In the regenerative mass illustrated in Figs. 4 and 5, three forms of tile are used; namely, a double tile 11, a single tile 21 and a double half tile 31. In Fig. 6 a section of a double tile 11 is shown and actual dimensions of a satisfactory tile are given as an example. This double tile has a single central groove 13 and two end grooves 14, each of which is half the size of the central groove 13.

In the tile 11 used as an example in Fig. 6, the three grooves in the top of the tile are ¼ in. deep and the center groove 13 is ⅝ in. wide and the two end grooves 14 are ⁵⁄₁₆ in. wide at the bottoms thereof. The main body 15 of the tile shown in Fig. 6 is ½ in. thick. Projecting downwardly from the bottom of the main body 15 of the tile 11 are a central projection 16 and two end projections 17, each of which is one-half the size of the central projection 16. All of these projections, in the tile selected as an example, project from the body of the tile ½ in. The groove 13 and the projection 16 are symmetrical about an axis 18. Assuming that such an axis exists for every double tile 11 in the mass, there will be three such axes 18, 19 and 20 in the mass. The weight of the mass is supported entirely along these axes and through the projections 16 and 17 on the individual tiles. These projections 16 and 17 fit rather loosely in the grooves 13 and 14 and serve to maintain the alignment of the tiles in the directions of the double-headed arrow 32 shown in Fig. 1. It will be noted that the tiles are staggered both in the direction of the arrows shown in Figs. 4 and 5 and also in a direction at right angles to these arrows.

I claim as my invention:

1. A tile adapted to be used in building up a regenerative mass for use in a furnace in which the tile is subjected to temperatures between 1500° F. and 3500° F., which comprises: a tile body which is essentially a flat slab of ceramic material suitable for withstanding said temperatures and having a high heat conductivity, said slab having grooves formed in the top thereof; and projections formed on the bottom of said slab which are so placed as to project into the grooves in a next lower tile in said mass, the projections extending further beyond the surface of said slab than the grooves extend into said slab so that lower channels are formed between the lower surface of an upper tile and the upper surface of the lower tile, said lower channels extending between the projections of the upper tile, said grooves and said projections each being continuous so that when slabs are superimposed uninterrupted openings with continuous walls are formed between the superimposed slabs.

2. A regenerative mass made up of a plurality of tiles as claimed in claim 1, said tiles being so laid that uninterrupted openings are formed in said mass, the openings each extending through the mass and having continuous smooth walls.

References Cited in the file of this patent

UNITED STATES PATENTS

| | | |
|---|---|---|
| 683,233 | Svan | Sept. 24, 1901 |
| 1,167,081 | Kennedy | Jan. 4, 1916 |
| 1,464,580 | Philipon | Aug. 14, 1923 |
| 1,703,793 | Stein | Feb. 26, 1929 |
| 1,961,258 | Totzek | June 5, 1934 |
| 1,973,851 | Feiler et al. | Sept. 18, 1934 |
| 2,473,427 | Hasche | June 14, 1949 |